United States Patent [19]

Gell

[11] 4,225,320
[45] Sep. 30, 1980

[54] INTERSTITIAL HYDROGEN STORAGE SYSTEM

[76] Inventor: Harold A. Gell, 13720 Lockdale Rd., Silver Spring, Md. 20906

[21] Appl. No.: 59,111

[22] Filed: Jul. 19, 1979

[51] Int. Cl.³ ............................................... F17D 1/04
[52] U.S. Cl. ........................................ 48/191; 123/3; 123/DIG. 12; 206/0.7; 422/112; 422/166; 422/198; 422/199
[58] Field of Search ........................... 48/61, 190, 191; 422/112, 162, 163, 164, 165, 166, 167, 305, 198, 199; 206/0.6, 0.7; 165/DIG. 17; 123/3, DIG. 12; 423/648 R, 645

[56] References Cited

U.S. PATENT DOCUMENTS

| | | | |
|---|---|---|---|
| 3,608,660 | 9/1971 | Smith et al. | 123/DIG. 12 |
| 4,018,190 | 4/1977 | Henault | 123/DIG. 12 |
| 4,110,425 | 8/1978 | Buhl et al. | 423/648 R |
| 4,135,621 | 1/1979 | Turillon et al. | 423/648 R |

OTHER PUBLICATIONS

Hydrogen in Metals, Westlake et al., Physics Today Nov. 1978, pp. 32–39.

Primary Examiner—Peter F. Kratz
Attorney, Agent, or Firm—Harold A. Gell

[57] ABSTRACT

A metal hydride fuel system incorporating a plurality of storage elements that may be individually replaced to provide a hydrogen fuel system for combustion engines having a capability of partial refueling is presented.

13 Claims, 5 Drawing Figures

INTERSTITIAL HYDROGEN STORAGE SYSTEM

TECHNICAL FIELD

My invention relates to the use of interstitial alloys of hydrogen with metals to create a fuel system for combustion devices of the class heretofore normally employing fossil fuels.

BACKGROUND OF PRIOR ART

Man's thirst for energy is rapidly depleting the worlds reserves of fossil fuels and the conversion of these fuels is rapidly polluting the environment and forcing ecological changes on the whole world. Modern man is concerned with his environment but he is more concerned with satisfying his needs for energy and these needs have created a fossil fuel economy which is headed for collapse due to the limited reserves and the ever increasing demands placed thereon.

Various alternatives to the use of fossil fuels for producing energy have been attempted but none have been able to compete with the convenience afforded by a fossil fuel powered engine or heating unit because of the simplicity of fuel storage and replacement.

One alternative to the use of fossil fuels is hydrogen which may be burned in all of the various engines serving man with essentially no pollution or change in the versatility and application of the engines. However, the portable storage and replenishment of suitable quantities of hydrogen poses a significant problem which heretofore has rendered the use of hydrogen as a fuel impractical. The drawbacks with using hydrogen as a fuel are created by the bulky systems used to store hydrogen. These systems normally employ high pressure tanks and cryogenic systems which are bulky, costly, difficult to maintain and infinitely dangerous to the point where the practical application of hydrogen as a fuel source has not been achieved.

An alternative to liquid hydrogen storage concepts is provided by the storage of hydrogen in stable metal hydrides, "Hydrogen In Metals," D. Westlake et al, Physics Today, November 1978. The density of hydrogen per unit volume is greater in many hydrides than in liquid or solid hydrogen. Compounds such as FeTi and LaNi$_5$ absorb up to one hydrogen atom per metal atom at room temperature and release the hydrogen when the temperature is raised only a few degrees. Hydrogen fueled systems utilizing metal hydrides have not met with success however because of the time required to refuel a depleted fuel reserve.

OBJECTIVES OF THE INVENTION

In view of the preceding, it is a primary objective of the present invention to provide a metal hydride source of hydrogen for combustion engines wherein the fuel reserve may be quickly replenished.

A further objective of the present invention is to provide an interstitial hydrogen storage system in which the hydrogen may be replenished by replacing spent or hydrogen poor hydrides with hydrogen rich hydrides.

A still further objective of the present invention is to provide a hydride fuel system incorporating a plurality of storage elements that may be individually replaced to provide a hydrogen fuel system having a capability of partial refueling.

It is another objective of the present invention to provide a hydrogen storage system wherein metal hydride hydrogen storage means are in the form of sintered bodies.

A still further objective of the present invention is to provide sintered metal hydride containers for hydrides adapted to function as hydrogen storage means.

SUMMARY OF THE INVENTION

The present invention comprises a hydrogen storage system for a combustion engine which utilizes interstitial alloys of hydrogen with metals as the hydrogen storage means and provides for the refueling of systems through the replacement of spent metal hydrides.

In one embodiment of the present invention, the hydrogen storage means is in the form of sintered metal bodies which may be removed from the fuel system for recharging after the hydrogen contained therein has been used. In an alternate embodiment of the present invention, a plurality of storage tanks are provided for granular metal hydrides and the individual storage tanks include means to remove spent metal hydrides and the replacement thereof with charged hydrides. A further embodiment of the present invention contemplates a hydrogen fuel system comprised of a plurality of tanks containing metal hydrides which may be easily removed from the fuel system and replaced with fully charged containers.

Sub-embodiments of all of the embodiments of the present invention are contemplated wherein a plurality of metal hydride units comprise a fuel system wherein hydrogen is extracted from one storage unit at a time to permit the operator to monitor the hydrogen remaining and partially refuel the system as needed.

BRIEF DESCRIPTION OF THE DRAWINGS

Details of my invention will be described in connection with the accompanying drawings, in which.

DESCRIPTION OF THE INVENTION

Figure 1:
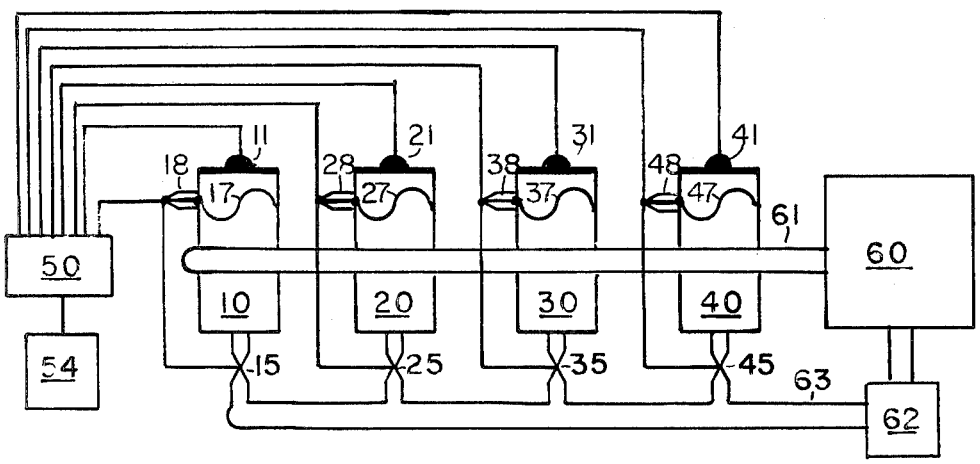
FIG. 1 is a schematic diagram of the proposed metal hydride fuel system for a combustion engine.

FIG. 1 illustrates a typical fuel system as might be employed for a home heating installation or an internal combustion engine application such as an automobile. For illustrative purposes, this discussion will assume that the fuel system is for an automobile incorporating an internal combustion engine illustrated in FIG. 1 as combustion engine 60. Also for illustrative purposes, it is assumed that the fuel system will incorporate four metal hydride fuel cells 10, 20, 30, and 40. However, it is to be understood that the actual number of fuel cells used in any deployed system may vary as a function of design requirements.

Considering FIG. 1 in detail, each fuel cell is a gas tight container containing a charge of metal hydride. An exhaust gas duct 61 from engine 60 is in heat exchange relationship with each of the fuel cells. The heat exchange duct is dimensioned so that it will provide a sufficient quantity of heat to the fuel cells to cause the release of enough hydrogen gas to run engine 60 at the desired speed. The system is self-regulating for as engine speed is increased, heat flow through duct 61 increases and therefore hydrogen release from the fuel cells increase. The actual volume of hydrogen supplied to engine 60 is governed by throttle valve 62 which, in the exemplary embodiment functions in a manner similar to the carburetor in an automobile in that it controls the volume of gas to the engine as a function of an operator control means.

Hydrogen to the throttle valve 62 is provided by hydrogen manifold 63 which is coupled to each of the hydrogen fuel cells by individual valves 15, 25, 35, and 45. In a preferred embodiment, these are electrically operated valves that function in a mutually exclusive fashion as a function of hydrogen pressure developed in the individual hydrogen fuel cells. Each hydrogen fuel cell includes a pressure transducer, 11, 21, 31, and 41 which is adapted to provide a pressure related logic signal to hydrogen fuel cell selection means 50. Hydrogen fuel cell selection means 50 operates valves 15, 25, 35, and 45 in a mutually exclusive fashion in response to the outputs of all of the hydrogen fuel cell pressure transducers in a manner wherein the hydrogen fuel cells are depleted in a sequential fashion. That is, when the fuel system is fully charged valve 15 is open and valves 25, 35, and 45 are closed. This permits the hydrogen evolved in cell 10 to enter the engine 60 via conduit 63 and throttle 62. When the hydrogen pressure as sensed by transducer 11 falls below a predetermined value, valve 15 is closed and valve 25 is open to permit hydrogen gas to be coupled from fuel cell 20 via manifold 63 to engine 60. When transducer 21 senses a predetermined minimal pressure, valve 25 is closed and valve 35 opens until such time that pressure transducer 31 senses a minimal pressure and then valve 35 is closed and valve 45 opened.

The metal hydride used as a hydrogen storage means in the fuel cells release hydrogen when the temperature of the hydride is raised a few degrees above ambient. This temperature increase is provided by exhaust conduit 61 as previously explained. However, heat must be applied to the fuel cell from which hydrogen is to be extracted when the engine is first turned on. This is accomplished by electrical heaters 17, 27, 37, and 47 associated with fuel cells 10 through 40 respectively. Electrical current to the fuel cells is provided during the start up period by hydrogen fuel cell control selection means 50. This system provides electrical current during the initial start up phase as a function of which hydrogen manifold valve is open. For instance, assume hydrogen manifold valve 25 is in the open condition. Under these circumstances, control 50 also applies an energizing potential to fuel cell heater element 27 via thermal cut out switch 28. The thermal cut out switch is responsive to the temperature of the associated fuel cell and it functions to interrupt current flow to the electrical fuel cell heater as soon as the fuel cell reaches operating temperature. Thus initially the fuel cell is heated to operating temperature by an electrical means and that electrical means is interrupted and the temperature maintained by the hot exhaust gases from the engine.

When the engine is initially turned on, the pressure transducers 11, 21, 31, and 41 sense zero pressure in their respective hydrogen fuel cells and provide cut off signals for the associated manifold valves. However, starter switch 54 provides an alternate source for electrical current to energize all of the hydrogen manifold valves and electric metal hydride fuel cell heaters. This function of starter switch 54 is a normally open, spring biased set of contacts which are held closed by an operator until engine 60 begins functioning. When engine 60 begins functioning, this is indicative of gas being generated by the fuel cells and the starter key may be released. When the override switch in the starter circuit 54 is open, the automatic control system 50 assumes control of the fuel system in a fashion which has been previously described and which is discussed in detail with respect to FIG. 5.

Figure 5:
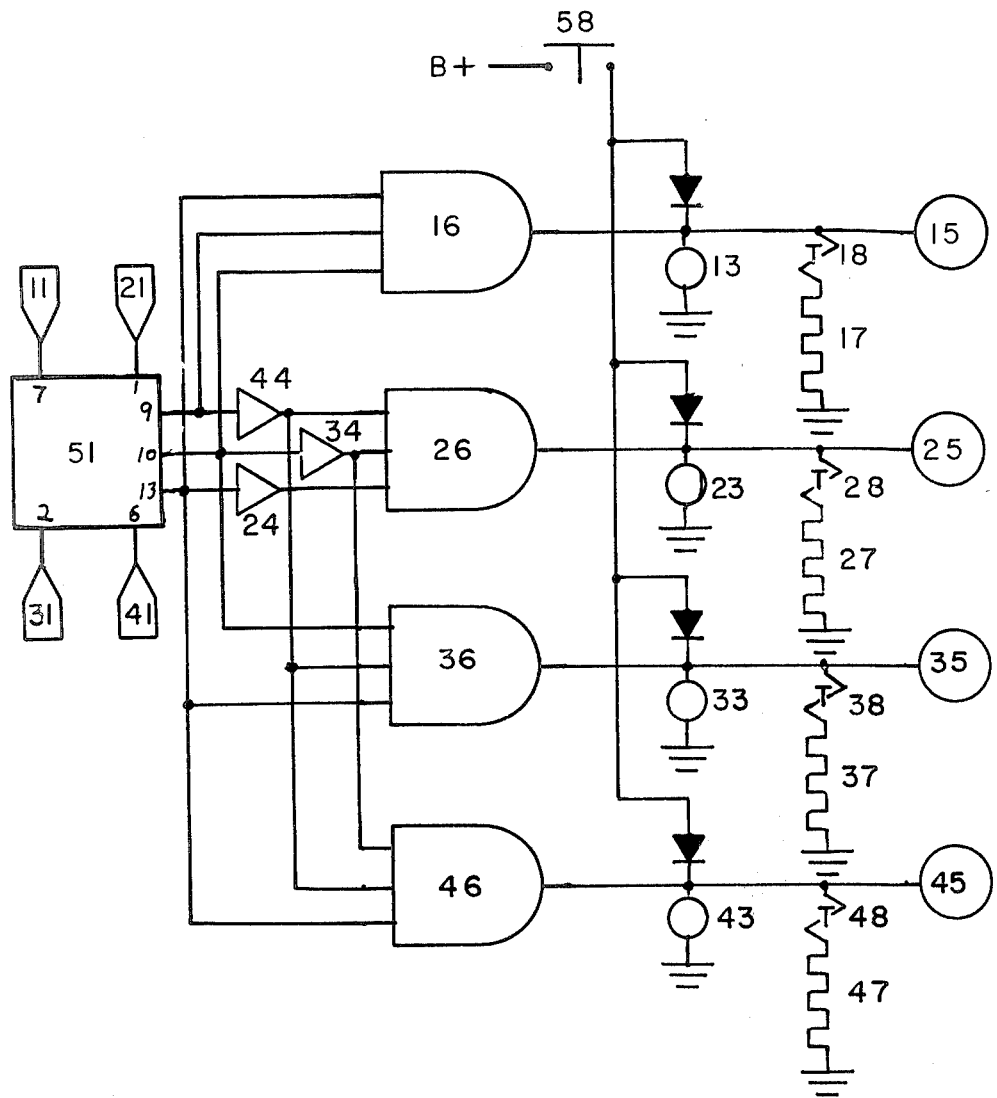
FIG. 5 is a schematic diagram of a control system for automatically selecting metal hydride fuel cells.

FIG. 5 illustrates the automatic hydrogen fuel cell selection circuitry 50 of FIG. 1 in detail. The circuit is comprised of a latch and driver integrated circuits and inverters and logic means interconnected to provide energizing potentials to hydrogen manifold valves as a function of the fuel cell pressure transducers. For instance, in FIG. 5, the selector 51 is comprised of a seven-segment latch and driver such as a type CD4511 integrated circuit. The four BCD input code lines of the circuit, input pins 1, 2, 6, and 7 are coupled to pressure transducers 21, 31, 41, and 11 respectively. The pressure transducers are configured so that a positive potential is applied to the inputs of selector 51 whenever the pressure is below a predetermined minimal value. Thus when the pressure is above the predetermined minimal value, a 0 logic level is applied to the respective input to control 51.

By way of example, assume that all four metal hydride fuel cells in the system each contain more than the minimum required operating pressure. Under these circumstances a logic 0 will be produced by each transducer and inputs 1, 2, 6, and 7 of selector 51 will be 0. Under these conditions, the outputs at pins 9, 10, and 13 of selector 51 will be a logic 1 and AND gate 16 will be trued, producing a logic 1 level at its output which is coupled to indicator lamp 13, fuel cell heater 17 via thermal cut-out 18 and hydrogen manifold valve 15. Indicator lamp 13 is the full indicator lamp to signify to the operator that he has at least ¾ of a hydrogen supply.

The outputs which trued AND gate 16 are applied to AND gate 26 via inverters 24, 34, and 44 and thus that gate is inhibited. The logic levels applied to AND gate 15 are also applied to AND gates 36 and 46, however, the logic level 1 from pin 9 of selector 51 is inverted by inverter 44 before application to AND gate 36 so that that AND gate is inhibited. Inverter 44 also inverts the input to AND gate 46 and inverter 34 inverts the logic 1 from pin 13 of selector 50 so that AND gate 46 will be inhibited. AND gates 16, 26, 36, and 46 are three-input AND gates such as can be found in the type CD4073 integrated circuit systems.

When the hydrogen supply in metal hydride fuel cell 10 has been depleted, the output of pressure transducer 11 transitions from a 0 to a logic 1. This causes the output of selector 51 at pins 9, 10, and 13 to transition from logic 1's to logic 0's. . This inhibits AND gate 16 and trues AND gate 26 via inverters 24, 34, and 44. When AND gate 26 is trued, a logic level 1 output is applied to indicator lamp 23 to signify that the fuel system is at least half full but less than ¾ full and it also applies current to heater 28 via thermal cut-off 27 and energizes hydrogen manifold valve 25.

When the hydrogen has been depleted from metal hydride fuel cell 20, the output of pressure transducer 21 transitions from a 0 to a logic 1. The inputs to selector 51 are now a logic 1 level at pins 1 and 7 with a logic 0 at pins 2 and 6. This causes the output at pins 13 and 10 to be at a logic 1 and the output at pin 9 to be a logic 0. Thus AND gates 16, 26, and 46 are inhibited and AND gate 36 is trued by the logic 1 outputs of pins 13 and 14 and the inverted logic 0 output of pin 9 via inverter 44. When trued, AND gate 36 applies a logic 1 level to indicator 33 to provide the operator with an indication that the fuel system is at least ¼ full but less than ½ full. The logic level 1 from AND gate 36 also provides a means to energize heater 37 via thermal cut-off 38 and open hydrogen manifold valve 35.

When the hydrogen in storage cell 30 is depleted, the output of pressure transducer 31 transitions from 0 to a logic 1 so that inputs 1, 2, and 7 to selector 51 are at a logic level 1 and input 6 is at a logic level 0. This causes the output of pin 13 to be a logic level 1 and pins 9 and 10 to be logic level 0's. This output inhibits AND gates 16, 26, and 36 and enables AND gate 46 through its direct coupling to pin 13 and inverted couplings to pins 9 and 10 via inverters 34 and 44. When trued, AND gate 46 provides a logic 1 level to cause indicator lamp 43 to become illuminated to indicate to the operator that the fuel system is less than ¼ filled. The logic level 1 output from AND gate 46 also causes energization of heater 47 via thermal cut-off 48 and opens hydrogen manifold valve 45.

When the hydrogen in fuel cell 40 becomes depleted, pressure transducer 41 shifts to a logic level 1 output and all four AND gates are inhibited, closing all four hydrogen manifold valves and extinguishing all the indicator lamps.

During the initial starting procedure, spring biased contacts 58 of FIG. 5 are held closed as previously explained with respect to starter switch 54 of FIG. 1. When closed, starter switch 58 applies a potential to energize all of the hydrogen manifold valves, fuel cell heaters and fuel quantity indicator lamps. As soon as the engine powered by the fuel system is functional, the spring loaded switch 58 is released and the system reverts to automatic operation as previously explained with respect to FIG. 5.

Figure 2:
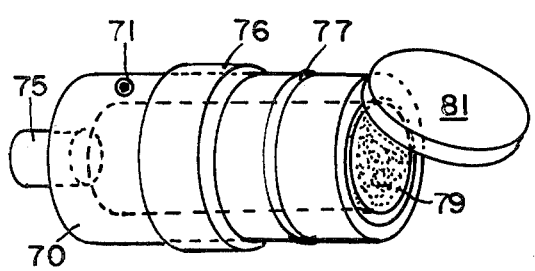
FIG. 2 illustrates a metal hydride fuel cell using a preformed, sintered metal hydride body.

FIG. 2 illustrates a preferred embodiment of the subject invention wherein each fuel cell is comprised of a gas tight container 70 which is adapted to receive a sintered fuel element 79 dimensioned to fit within container 70. Container 70 includes a pressure transducer 71 which provides a control signal as previously described with respect to the pressure transducers of FIGS. 1 and 5. Container 70 also includes an outlet 75 which is coupled to an associated hydrogen manifold control valve. A gas conduit 76 is in heat exchange relationship with the container and it is adapted to channel exhaust gases from the associated engine around the container so that the metal hydride element may be heated to a temperature sufficient to drive off hydrogen. Also provided in heat exchange relationship with container 70 is heater element 77 which functions similar to the electrical heaters described with respect to FIGS. 1 and 5 to provide a means to initiate hydrogen release until the associated engine is running.

One end of the container 70 is open to provide a means whereby the sintered metal hydride fuel element may be replaced. A gas tight cover is provided so that when a metal hydride fuel element is inserted, the container may be made gas tight. Dog latches, threaded members or any convenient means may be utilized to secure the container cover 81 to container 70.

If desired, alternate embodiments may be incorporated wherein fuel element 79 may be a porous canister filled with a metal hydride or metal hydrides may be packed loosely into canister 70 and removed by a scoop or vacuum means for replacement purposes.

In operation, when the vehicle carrying the described fuel system is in need of hydrogen replenishment, the depleted fuel element such as fuel element 79 is removed from the container and replaced with a fully charged metal hydride element. The depleted metal hydride element which was removed is placed in a recharging facility wherein the hydrogen may be replenished after which the element may be used by the same fuel system or a different fuel system incorporating the same type of fuel container.

Figure 3:
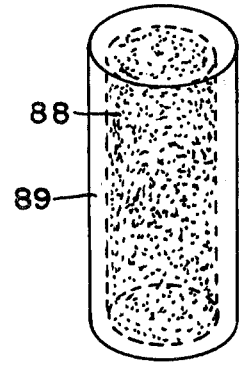
FIG. 3 is a cutaway view of a preformed sintered metal hydride fuel element formed as a container for granular metal hydrides.

It is anticipated that gasoline service stations as presently known could provide recharging facilities for metal hydride elements whereby vehicles using hydrogen systems could be refueled in a quick and efficient manner by the simple replacement of a fuel cartridge. FIG. 3 illustrates one embodiment of a sintered metal hydride fuel cartridge wherein the fuel cartridge 89 is in the form of a hollow sintered body which is filled with a granular metal hydride. As previously suggested, a porous body such as a cloth or metal mesh container may be used to contain a granular metal hydride charge for a fuel cell. Alternately, the cartridge may be a solid sintered body.

Figure 4:
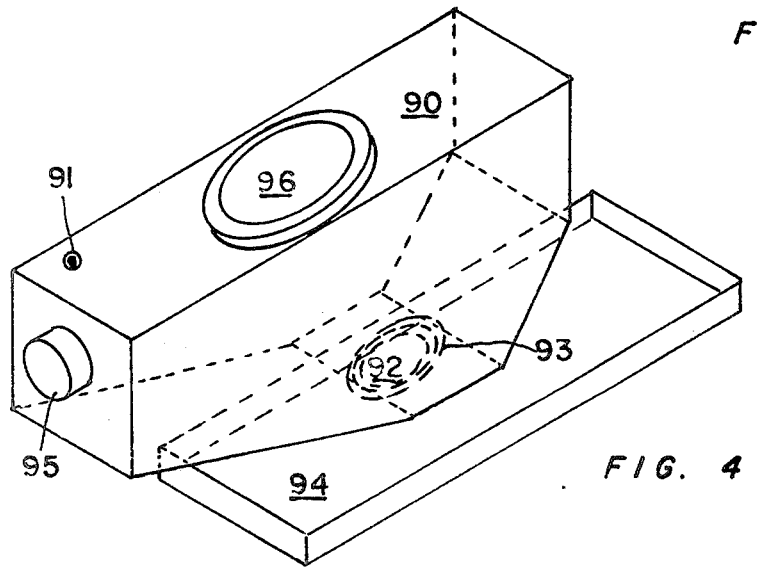
FIG. 4 illustrates an alternative embodiment for the metal hydride fuel cells wherein the cell may be replenished by replacing spent metal hydrides which are in a fluid or granular form.

FIG. 4 is an alternate fuel cell embodiment which is comprised of a container 90 incorporating a pressure transducer 91 and hydrogen outlet 95 which functions similar to transducer 71 and hydrogen outlet 75 of container 70 in FIG. 2. Container 90 of FIG. 4 however is adapted to receive a charge of granular metal hydrides. To this end, container 90 is provided with a sloping bottom which terminates in an opening 92 so that a receptacle may be placed under container 90 to receive exhausted metal hydrides from opening 92 when cover 93 is removed. After the spent metal hydrides are removed via opening 92 and collected in tray 94, the hydrides may be placed in a recycling device to replenish the hydrogen extracted during use of the fuel cell. Replenished metal hydride is added through opening 96 in the top of container 90 and after container 90 is charged, a cover is placed over opening 96 to provide a gas tight chamber which will function in a manner similar to chambers 10 through 40 and 70 as previously described. Container 90 incorporates gas and electrical means similar to those incorporated in container 70. In this embodiment, it is anticipated that metal hydrides of a consistency allowing for fluid flow would be used and service facilities for drawing or pumping out and pumping in hydrides would be used to service the system in a fashion similar to the way fossil fuel systems utilizing liquid fossil fuels are serviced. In this system containers or fuel tanks need not be standardized and replenished metal hydrides could be sold by volume or weight as dispensed.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. An interstitial hydrogen fuel system, comprising:

a metal for interstitially storing hydrogen as a metal hydride;

a plurality of gas tight containers containing said metal hydride;

a hydrogen manifold;

a valve means for each of said gas tight containers operatively connected for coupling said gas tight containers to said hydrogen manifold, pressure transducers operatively connected for sensing the gas pressures in said containers, and control means connected to said valve means said control means including logic means for producing a control signal for opening each of said valves in a mutually exclusive manner as a function of pressure in said containers as sensed by said pressure transducers.

2. An interstitial hydrogen fuel system as defined in claim 1, wherein said metal is a sintered metal charge.

3. An interstitial hydrogen fuel system as defined in claim 1,
wherein said metal is in the form of preformed hydride charges dimensioned to fit within said containers.

4. An interstitial hydrogen fuel system as defined in claim 3 wherein said gas tight containers includes access means whereby said preformed hydride charges may be removed and replaced.

5. An interstitial hydrogen fuel system as defined in claim 4 wherein said preformed hydride charges are comprised of a sintered metal hydride body.

6. An interstitial hydrogen fuel system as defined in claim 3 wherein said preformed hydride charges are comprised of:
a porous container; and
a granular hydride contained within said porous container.

7. An interstitial hydrogen fuel system as defined in claim 6 wherein said porous container is fabricated from sintered metal hydride.

8. An interstitial hydrogen fuel system as defined in claim 1, wherein each of said gas tight containers includes a dump means for discharging spent hydrides and a fill means for admitting hydrogen saturated hydrides.

9. An interstitial hydrogen fuel system as defined in claim 1, further comprising: electrical heating means responsive to said control means and operatively connected for heating said hydride charges in said gas tight containers.

10. An interstitial hydrogen fuel system as defined in claim 1 wherein said gas tight containers are constructed to permit replacement of said hydride charges.

11. An interstitial hydrogen fuel system as defined in claim 10 wherein said hydride charges are comprised of preformed sintered metal hydride bodies.

12. An interstitial hydrogen fuel system as defined in claim 10 wherein said hydride charges are comprised of metal granulas.

13. An interstitial hydrogen fuel system as defined in claim 1, wherein
said logic means provides a plurality of logic level signals as a function of the combined inputs from said pressure transducers; and
said control means includes a logic gate for each of said valve means for controlling the operation of said valve means in a mutually exclusive manner with respect to the other ones of said valves as a function of said logic level signals from said logic means.

* * * * *